Jan. 19, 1965   C. H. WATTS   3,165,799
PROCESS AND SLURRY FORMULATION FOR MAKING
PRECISION CASTING SHELLS
Filed Oct. 17, 1961
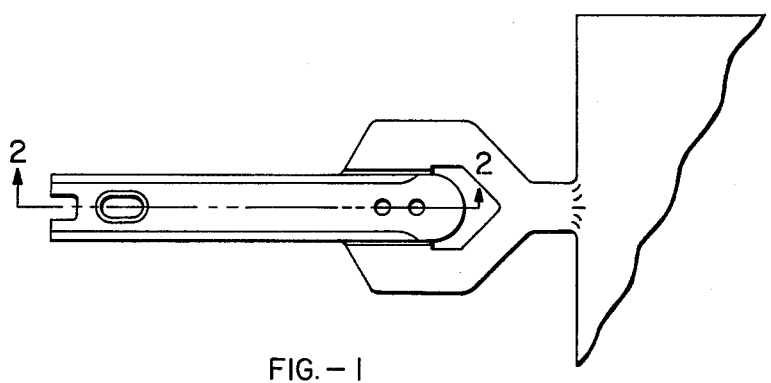
FIG.— 1
FIG.— 2
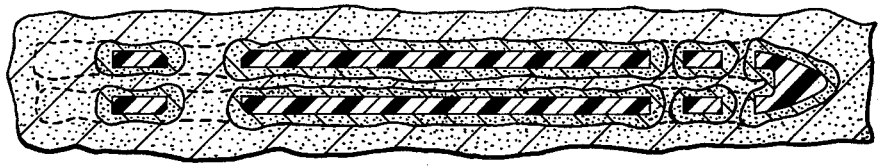
FIG.— 3
INVENTOR.
CLAUD H. WATTS
BY *Watts Edgerton Ryl & Fisher*
ATTORNEYS United States Patent Office 3,165,799
Patented Jan. 19, 1965

3,165,799
PROCESS AND SLURRY FORMULATION FOR
MAKING PRECISION CASTING SHELLS
Claude H. Watts, Lyndhurst, Ohio, assignor to
Precision Metalsmiths, Inc.
Filed Oct. 17, 1961, Ser. No. 145,713
7 Claims. (Cl. 22—196)

This invention is concerned with improved methods and materials for making metal castings by the "lost wax" or "lost pattern" method of precision investment casting sometimes known as the "lost wax process." It is particularly directed toward the more recent development of the monolithic shell mold for metal casting.

In order to describe fully the invention and the objects of the invention the following is a description of shell techniques prior to this invention. This description is directed to the process, materials, and procedures used, pertaining to the methods commonly in use for formation of the shell.

(1) The wax or plastic patterns are assembled to a runner system. This entire assembly, which consists of the runner system and the patterns, is variously referred to as a tree, a gating system or setup. The entire assembly is made of heat disposable material.

(2) The next step is to surround these patterns, and this gating system with refractory slurry in such a manner as to produce a ceramic shell mold.

The formation of a ceramic shell around the assembly of patterns to a runner system, is accomplished by repeated dipping of the set-up into a refractory slurry of controlled viscosity followed by careful directional draining so as to give uniform coverage, and then sprinkling coarse refractory grain onto this slurry. The result is a coat of ceramic material with refractory particles embedded in the surface. This coat is hardened, usually by air drying to evaporate the vehicle carrying the binder.

After the first coat is sufficiently dry and hard, the steps of dipping, draining, sprinkling or refractory, and drying are repeated until a ceramic shell about ¼" to ½" thick is formed around the assembly of patterns and runner system.

The refractory slurry used for dipping comprises a binder, a liquid vehicle, and a refractory flour. These ingredients are blended together in the proper proportions to give a slurry having a viscosity that is suitable for the dipping and draining operation.

The two liquid vehicle and binder systems that are generally used are:
(1) Silica=sol in a water system.
(2) Hydrolyzed ethyl silicate in an alcohol system.

Several silica-sol-water systems are commercially available. Following are three of these binder systems together with trade names, and names of manufacturers.
(1) Nalcoag—Nalco Chemical Company, Chicago, Illinois
(2) Ludox—Du Pont
(3) Syton—Monsanto Both of these binder systems have been used in shell slurry formulations for making refractory shell molds.

The refractory flour used is usually minus 100 mesh. Silicon dioxide, fused quartz, fused aluminum oxide, tabular alumina, zirconia, and zircon are among the materials most commonly used.

The stuccoing material is generally much larger in particle size than the refractory flour used in the slurry. The shape may vary from spherical particles to irregular acicular or needle shaped grains having a major and minor axis. The materials used for stuccoing purposes are generally in the group consisting of granular zircon, fused silica, silica, various aluminum silicate grogs including mullite, sillimanite, etc. fused alumina, tabular alumina and similar material. From six to eight dips are usually applied to build up a shell thickness of from ¼" to ½".

While the above described process has produced satisfactory results for a number of parts, it is well recognized among those skilled in the investment castings art that one of the major advantages of this particular phase of metal founding lies in the ability of the foundry to produce a wide variety of complex shapes including unusual configurations of cored holes, slots, blind passageways, and other small openings. It is in this area that the prior art has failed in providing suitable materials, methods, and procedures to produce satisfactory results.

One of the objects of this invention is to provide a means and improved shell slurry compositions for forming an improved shell mold having internal cores and passageways that are satisfactorily filled with shell slurry to provide sufficiently solid and continuous internal coring for complex shapes.

Other objects and a fuller understanding of the invention may be had by referring to the following description and claims taken in conjunction with the accompanying drawings in which:

FIGURE 1 is a perspective view of a single wax pattern projecting from a surface representing a sprue, prior to application of any slurry dip;

FIGURE 2 is a section through the workpiece only, taken along line 2—2 of FIGURE 1, eliminating the gating members, and with a first dip of sanded shell slurry applied; and, FIGURE 3 is the section of FIGURE 2 with a proper filling of later applied shell slurry forming a solid core.

Those familiar with the art of lost pattern precision casting understand the various advantages and disadvantages with respect to each of the two basic processes consisting of investment casting and shell mold casting. In the former the disposable patterns are completely covered and surrounded in a mass of investment material. In the newer shell mold technique the patterns are dipped repeatedly until a mold of sufficient thickness is built up around the pattern assembly.

With the investment process, it is usually not difficult to use vibration and similar techniques, together with a sufficiently thin investment slurry, to completely fill all of the small voids of a complex pattern form. The only problem encountered in investment mold making is to be certain that the investment material reaches the innermost recesses of all cavities. If the material is caused to reach all of the recesses there is nothing to cause it to leave this location and hence the mold will be complete and sound.

On the other hand, when repeated dipping is used to form a shell mold, if the dipping slurry is thin enough to reach back into the small cavities of a complex mold it is also thin enough to run back out. If the slurry composition is made sufficiently thick to stay in the small recesses, it is usually too thick to get there. One cause preventing the complete filling with thick slurries is that the pre-coat dip, after drying, tends to absorb moisture from the next dip and hence to cause the slurry to thicken to the point that it cannot run completely to the depth of recesses.

Furthermore, when the pre-coat dip is dried, many small voids are left by escaping moisture and gases. When the newer and thicker dipping solution is added it will displace the air trapped in these small pockets and a bubbling effect will take place which also weakens the resulting fill and tends to block the complete fill of the cavity. This trapped air will often collect and cause a void which results in the cast piece being scrapped.

This invention, therefore, is a combination of techniques and materials which have brought about the satisfactory filling of such intricate spaces by the dip and drain process necessary to produce a casting shell.

In order to fully understand the invention, one complete preferred embodiment is set forth hereinafter and this explanation will be based upon the correct type of dipping slurry. Hence, the formulas for the preferred embodiment of slurry are set forth first with the explanation of how to employ the slurries following thereafter.

The formula for solution No. 1 used for the first slurry dip is as follows:

5,990 cc. water base solution of colloidal silica sol containing 35% $SiO_2$. (Common source is Nalco Chemical Co., Chicago, Illinois; their product known as Nalcoag 35%.)
6 cc. Aerosol OT 75% (di (2 ethyl hexal sodium sulfosuccinate)
7.5 cc. water emulsion of polymethyl siloxane (preferred source: General Electric Antifoam #60)

These materials are carefully measured or weighed into any suitable mixing container and stirred until all liquids are thoroughly dispersed to form a uniform solution. The solution may be used immediately for slurry preparation.

FORMULA FOR SLURRY #1

4,500 cc. solution #1
20 lbs. Zirconite Flour "A" (99%—325 mesh $Z_r SiO_4$)
14 lbs. fused $SiO_2$ flour (—325 mesh)

Adjust to a viscosity of 1,300 to 1,500 cps. using a Brookfield Viscosimeter. Note: Slight variations in the particle size and specific gravity of the water base silica sol, plus variations in the particle size of the refractory flours usually requires small additions of solution or powder to adjust the viscosity to the proper working range.

The slurry should be stirred continuously so as to keep the refractory particles in suspension.

*First step in process*

The first dip is made by immersing the set-up completely into the slurry and then withdrawing followed by directional draining to give a uniform coating.

The set-up must be drained sufficiently so that the application of the refractory stuccoing material will arrest any further draining.

Stucco with "G" granular zircon ($ZrSiO_4$) having a grain size of approximately .005 in. This operation may be accomplished either by sieving or by rotating the set-up under a vibrating screen or by immersing the set-up in a "fluid bed" of the zircon grain.

The pattern cluster should now be uniformly coated with the No. 1 slurry plus refractory zircon stucco.

Enlarged cross section view in FIGURE 2 of drawing shows pattern with narrow circular section slot and connecting small hole at right angle of base of slot. FIGURE 3 shows first ceramic layer plus stucco grains.

The first coat is air dried. Forced air drying is desirable, especially for complex parts with deep recesses or other areas where satisfactory drying may be a problem.

After the first coat is sufficiently dry, the pattern cluster is ready for the next step in the shell building process. This step involves the first in the series of materials and procedures that are new and improved.

*Background for second step in process*

In the building of a shell by the prior art process it is usual practice to thin down the viscosity of the slurry so that it will run in and wet the relatively narrow and previously coated slots or other difficult areas to coat. Since the ceramic layer has hardened by the evaporation of the water vehicle, a network of minute voids or air pockets are present. This, of course, is desirable in the production of a satisfactory shell since in this way the finished shell has sufficient permeability to allow the metal being cast to flow into the mold and permitting the mold gases to escape through the porous shell.

However, these minute air pockets present problems in the building of a satisfactory shell. For example, as the water in the slurry of the second dip penetrates the dried first coat, air is eliminated and air bubbles form. These air bubbles may not be a problem on outer surfaces where excess slurry can aid in their removal during the directional draining process. However, these bubbles prevent slurry from running in and covering areas such as illustrated in the drawing. Air pockets and failure to form a solid and continuous shell mold in narrow recessed holes and slots, allows metal to run through the thin first coat at the time metal is cast, and the result is a scrap casting.

A vacuum technique is used in this process to apply the second coat and assure that the coat fills all of the narrow slots and internal configurations. Internal air pockets are thus removed and the slurry is forced into all restricted passages.

It has been found possible to formulate a refractory shell slurry composition and adjust the viscosity so that:

(1) It can be vacuum processed and be of thin enough viscosity to flow into narrow slots and recesses.

(2) Have a sufficiently high viscosity so that it will remain in these recessed areas during subsequent draining operations so as to provide a solid and continuous shell mold.

(3) And further, since it is obviously impossible to stucco or apply larger refractory grain to the shell slurry that has been vacuumed into place internally, the solidly packed shell slurry must not crack on hardening.

*Novel material for process—Solution #2*

6,750 water base solution of colloidal silica sol containing 35% $SiO2$. (One commercial brand is Nalcoag 35% made by Nalco Chemical Co., Chicago, Illinois)
6 cc. Aerosol OT 75% (di (2-ethyl hexal sodium sulfosuccinate)
7.0 cc. (General Electric Antifoam #60) water emulsion of polymethyl siloxane (Source: General Electric Antifoam #60)
784 grams of a polyvinyl alcohol solution containing 720 grams polyvinyl alcohol (Du Pont trade name "Elvanol" grade 72–60) and
6,000 cc. water This solution contains an addition of about 1% by weight of polyvinyl alcohol. Additions of polyvinyl alcohol in the range of .5% to about 2% have been found to improve the green strength of the shell far above what would normally be expected. The combination of a binder system comprising a silica sol and polyvinyl alcohol has resulted in slurry compositions having green strengths that are greater than the combined strength values obtained on test specimens prepared using each binder separately.

FORMULA FOR SLURRY NO. 2

4,000 cc. Solution No. 2
13 lbs. granular zircon
  Sieve analysis:
    On 100 mesh—.5%
    On 120 mesh—1.7%
    On 140 mesh—15.8%
    On 170 mesh—21.9%
    On 200 mesh—27.0%
    On 325 mesh—32.9%
    Pan—.1%
16 lbs. Zircon flour 100% minus 100 mesh-relative particle size as measured with a Fisher Sub-sieve sizer 5–10 microns 11 lbs. fused silica flour 100% minus 100 mesh. Relative particle size as measured with a Fisher Sub-sieve sizer 5–10 microns.

The full chemical name and source under trade names have been given, the balance of this specification will refer only to "Elvanol."

The solution and refractory materials are added to a mechanical mixer and blended to give a uniform slurry. The most suitable viscosity for most applications has been found to be about 8,500 ctps. as measured with a Brookfield Viscosimeter. The viscosity test is run using a No. 4 spindle at 20 r.p.m. The reading is made on the 0–100 scale using a multiplying factor of 100 to convert from dial reading to viscosity in centipoise.

The workable range of viscosity within which satisfactory results can be obtained has been found to be between 7,000 ctps. to 10,000 ctps. Viscosities thinner than 7,000 ctps. tend to run out during draining. Viscosities thicker than 10,000 ctps. are generally too thick to flow satisfactorily under vacuum processing.

*Slurries and their characteristics*

A series of slurries were prepared as described below. Transverse test bars 6" long by 1" wide by .22 thick (Note: Thickness varied slightly from specimen to specimen. Therefore, each test piece was measured separately in calculating the modulus of rupture from the breaking load data.) Test runs using equipment as described in ICI Tentative Test Methods for Determining the Physical Properties of Proprietary Investments for Use in the Investment Casting Industry. Available from the Investment Casting Institute, 27 E. Monroe Street, Chicago 3, Illinois.

Three types of solutions were prepared.

(1) Water base slurry comprising a binder of polyvinyl alcohol only with refractory powder.
(2) Water base slurry comprising a silica sol binder only with refractory powder. Seven different densities of silica sol binder were tested.
(3) Water base slurry comprising a combined silica sol and polyvinyl alcohol binder with refractory powder.

Seven different densities of silica sol binder were tested same as in 2 above.

*Slurry formulas*

Solution No. 1.—Concentrated polyvinyl alcohol solution (Elvanol 72–60):
  720 g. Elvanol 72–60
  6,000 cc. water
Slurry A:
  500 ml. water
  58 g. solution No. 1 above (concentrated polyvinyl alcohol solution)
  .4 ml. Aerosol OT 75%
  .475 ml. G.E. Antifoam #60
  1.65 lbs. zircon fluor
  1.10 lbs. fused $SiO_2$ flour
Slurry B:
  500 ml. silica sol binder
  .4 ml. Aerosol 75%
  .475 ml. G.E. Antifoam #60
  1.65 lbs. zircon flour
  1.10 lbs. fused $SiO_2$ flour Seven different slurries were made with varying silica sol densities as indicated in Tables 1 and 2.

Slurry C:
  500 ml. silica sol binder
  58 g. Solution No. 1 above (concentrated polyvinyl alcohol solution)
  .4 ml. Aerosol OT 75%
  .475 ml. G.E. Antifoam #60
  1.65 lbs. zircon flour
  1.10 lbs. fused $SiO_2$ flour Test specimens were made by dipping the test piece into slurry, draining to a uniform coating, stuccoing, and air drying. These operations were repeated six times, thus making transverse test bar specimens in the same manner that production shells are produced.

The modulus of rupture in Table No. 1 was calculated from the transverse breaking load given in Table No. 2 using the formula.

$$M.O.R. = \frac{(1.5)(\text{Breaking loan in lbs.})(4.06)}{W \times (t)^2}$$

where $w$ = width in inches
$t$ = thickness in inches and where the load was applied in the center of a 4 inch span.

TABLE NO. 1

| | Modulus of Rupture (p.s.i.) | | | | | | |
|---|---|---|---|---|---|---|---|
| Silica Sol Density | 1.075 | 1.190 | 1.205 | 1.245 | 1.283 | 1.335 | 1.375 |
| Slurry A (Elvanol only) | 143 | 143 | 143 | 143 | 143 | 143 | 143 |
| Slurry B (Silica Sol only) | 111 | 230 | 225 | 269 | 242 | 262 | 283 |
| Sum of above two | 254 | 373 | 368 | 412 | 385 | 405 | 426 |
| Slurry C (Elvanol+silica sol) | 470 | 672 | 677 | 685 | 758 | 698 | 641 |

TABLE NO. 2

| | Breaking Load (lbs.) | | | | | | |
|---|---|---|---|---|---|---|---|
| Silica Sol Density | 1.075 | 1.190 | 1.205 | 1.245 | 1.283 | 1.335 | 1.375 |
| Slurry A (Elvanol only) | 1.31 | 1.31 | 1.31 | 1.31 | 1.31 | 1.31 | 1.31 |
| Slurry B (Silica Sol only) | 1.31 | 2.25 | 2.03 | 2.22 | 2.16 | 2.18 | 2.22 |
| Sum of above two | 2.62 | 3.56 | 3.34 | 3.53 | 3.47 | 3.49 | 3.53 |
| Slurry C (Elvanol+Silica sol) | 3.54 | 5.94 | 5.56 | 6.06 | 6.85 | 6.10 | 5.90 |

Table 1 shows that the combination of Elvanol binder plus silica sol binder gives strength values expressed as modulus of rupture in p.s.i. that are substantially greater than what would reasonably be expected from a study of tests made using each binder system separately.

For example—Slurry C made with a combination of Elvanol and silica sol (density=1.283) had a modulus of rupture of 758 p.s.i.

Each binder used separately gave for Slurry A 143 p.s.i. and for Slurry B (Silica Sol only density 1.283) 242 p.s.i. for a total of 385 p.s.i. The difference 758−385=373 p.s.i. or an increase of 97% for the combination.

The lowest percentage increase (50%) was obtained for the silica sol having the highest density (1.375).

The highest strength value was obtained with a silica sol having a density of 1.283, in combination with the Elvanol binder.

This combination of binders has proved to be particularly well suited for the vacuum process of shell making and especially for difficult internal cores and complex configurations which places unusual requirements on the materials and binders used for such applications.

It should also be noted that in the formula for the No. 2 slurry, 13 pounds of granular zircon are used as part of the refractory. These particles are coarser than the usual powders commonly employed in preparing shell slurry compositions.

The particles are not too large, in that they do not hinder the smooth flow of the slurry during vacuuming. The particles are also round in shape which also aids in flowing. The presence of larger grain sizes (about .005") compared to 5–10 micron for the refractory flour aid in strengthening the internal ceramic core shaped that are formed by the vacuum process.

For some applications a slurry made using only refractory flour having a relative particle size of 5–10 micron may be used to obtain satisfactory results. Therefore, it is not intended to specify the addition of granular zircon to the slurry as necessary to the successful application of the invention. However, it is the preferred formulation for the majority of applications that have been tested to date.

Having thus described the refractory slurry for the second coat and the equipment for vacuum processing, following is the procedure used for applying the second coat.

Second step in process

The slurry mix must be vacuum treated before use in production in order to remove dissolved and occluded air from the slurry. For satisfactory vacuum treatment and production operations a good vacuum pump capable of producing 2 mm. Hg absolute vacuum on a dry system and with sufficient capacity (30 c.f.m.) should be used. The slurry must "boil" vigorously during the vacuum treatment.

After the initial vacuum treatment, the slurry will rise no more than an inch or so, so that production work can be carried out in normal size containers without having the slurry expand and spill out.

The set-up is immersed completely in the No. 2 slurry and held in place with a suitable holding fixture. Otherwise the set-up will float or hit against the sides, breaking off patterns. The slurry tank with set-up immersed is enclosed in an air tight container and placed under vacuum. Vacuuming is continued until the slurry starts to "boil." The vapour pressure of water at 26° C. (78.8° F.) is 25.209 mm. Hg. A vacuum pump having a capacity of 30 c.f.m. and capable of producing a vacuum of 2 mm. Hg absolute under dry conditions is capable of production of an indicated vacuum of 10 mm. to 16 mm. Hg absolute under actual operating conditions with the slurry "boiling." The slurry should be vacuum "boiled" for about 1 minute. During this time all air is removed from the first coat and the "boiling" action wets the refractory surface of the first coat. Slight vibration is sometimes desirable during the vacuuming operation to aid in clearing air bubbles from the slurry and around the patterns. After one minute vacuum treatment air is gradually introduced into the chamber and the slurry is forced by air pressure into all undercuts, internal slots, cores, or other difficult recesses. The composition of the slurry plus the carefully controlled viscosity now makes it possible to drain the pattern in such a manner that the excess is removed from the external portions while the internally formed cores remain solid and continuous. Ordinarily, vibration or other aids to draining are not indicated at this point. Normal directional draining will give uniform external coverage without disturbing the ceramic slurry forming the internal cores.

Stuccoing material is applied to the slurry coat either by sieving on or immersing in a fluid bed. The coat is now allowed to harden by force air drying for about 1 hour.

Finishing steps

A third dip is now made in slurry No. 2. This dip usually does not require vacuum treatment, since all internal areas are filled. A simple dip, drain and stucco sequence is all that is required. Draining may be accomplished simply by rotating the pattern set-up either by hand or mechanically and allowing the excess to flow off by gravity, or the draining can be hastened in this instance by application of gentle vibration plus rotation.

Additional dips are applied in the same manner as the third dip until from 5 to 7 dips have been given to the set-up. These 5–7 dips are sufficient in most instances, however a greater or lesser number may be used depending upon size and configuration of parts being processed.

As described above, the vacuum treatment of the refractory slurry which comprises one aspect of the invention is used only during the second application of the slurry to the pattern. While this single vacuum treatment is sufficient in many applications of the invention, it is to be understood that certain pattern formations may make it desirable to use a vacuum treatment during the first dip and any one or more subsequent dips. For example, if the pattern has intricate surface detail, such as numbers or other indicia, the first or primer refractory coating may advantageously be vacuum treated. This prevents the detrimental occurrence of air bubbles at the surface of the pattern and thus assures that the slurry will uniformly coat and fill the intricate surface detail. Another concomitant advantage of an initial vacuum treatment is that the dried primer refractory coating is dense and subsequently free of voids that are conventionally formed by escaping gases. Consequently, when the second refractory coating is applied, it will be free of air bubbles created by escaping air trapped in the voids of the first coating.

Although the drawing illustrates complete filling of the long passageway in the part illustrated, this particular size opening is actually quite difficult to fill in one step as thus far described. Hence, if the size is large enough that the slurry does tend to come back out of the opening when the described procedure is followed, one of the following alternate steps of operation may then be employed:

*First alternate.*—The slurry, stuccoing materials and other steps in the shell building process are essentially the same as described heretofore, but with one essential exception. To fill the narrowed slot with a second coat without force it is necessary to use a much thinner slurry. The No. 1 slurry may be used for this purpose by adding more binder solution and adjusting to a viscosity to 250–300 ctps. This slurry may be designated as Slurry No. 1a.

*Second alternate.*—A further alternate procedure embodies the use of the No. 1 slurry without alteration and applying by the vacuum process as described for use with the second slurry used for final fill.

To summarize:

(1) There is no problem in filling narrow, long, deep or other difficult interstices by investment methods because the slurry is simply made sufficiently thin and then vibrated or vacuumed into place.

(2) To core fill a small interstice by shell practice is a far more difficult problem. A thin slurry will run in, but will also run back out. Making known exterior shell slurries thick enough makes them impossible to get into the small places, and not strong enough in thin sectins if filling could be accomplished. The thin slurries cannot be repeated to build up a fill, because when the opening gets small it cannot be sanded, and if not sanded the thin slurry will continue to run out.

(3) This difficult situation has been overcome heretofore by making preformed cores and casting pattern material around the core.

(4) This invention provides a process of building a shell mold around a disposable pattern by successive steps of applying a coating of refractory slurry, stuccoing, and drying, and contemplates one or more vacuum treatments during the applications of the slurry coatings. According to another aspect of the invention, one or more of the refractory slurries may comprise a unique binder combination to give a strength unknown heretofore.

Although the invention has been described in its preferred form with a certain degree of particularity, it is understood that the present disclosure of the preferred form has been made only by way of example and that numerous changes in the details of construction and the

What is claimed is:
1. The improved process of forming a shell mold around a disposable pattern and simultaneously forming a solid core within restricted passageways of the pattern, comprising, providing a slurry capable of flowing by gravity into all interstices of the pattern, dipping the pattern into said slurry and draining excess slurry followed by stuccoing all surfaces including the interstices to arrest excess draining, thereafter providing a second slurry having a binder consisting principally of silica sol with from about .5% to 2% by weight of polyvinyl alcohol and having a viscosity substantially within the range of from 7,000 centipoises to 10,000 centipoises, determining the existence of any internal cavities from which such second slurry would drain if filled with such slurry and reducing such cavities by a further dip in thin slurry followed by stuccoing, and thereafter placing the pattern into a bath of such second slurry and reducing the atmospheric pressure surrounding the bath and thereafter restoring the atmospheric pressure to drive the second slurry fully into any remaining interstice, and finally finishing the building of the external shell by dipping and stuccoing.

2. In the process of claim 1, said further dip to reduce the cavity size being a vacuum fill of the first slurry followed by draining and stuccoing.

3. The process of building a shell mold around a disposable pattern comprising the steps: (1) providing a refractory powder plus binder slurry of about 1300 to 1500 centipoises and a separate stucco means having a very fine granular refractory; (2) dipping a pattern to be cored and coated into said slurry, draining excess slurry, and thereafter applying the very fine stucco to arrest further draining; (3) providing a second slurry of refractory powder with a combination of silica sol and polyvinyl alcohol as binders and adjusted in viscosity within a range between 7,000 centipoises and 10,000 centipoises; (4) placing said disposable pattern under a bath of said second slurry and evacuating the atmosphere around the bath, whereafter the normal pressure is restored, and (5) finishing the shell by conventional methods of dipping and stuccoing.

4. In the process of claim 3, said second slurry being a silica sol binder type with an addition of from about .5% to about 2% polyvinyl alcohol by weight.

5. A process of building a shell mold around a disposable pattern having restricted passages comprising applying a first refractory coating to said pattern, drying said first coating, applying another refractory coating to said pattern by dipping the pattern into a refractory slurry bath, said refractory slurry bath being characterized by having a viscosity thin enough so that it can be forced into the restricted passages, a viscosity high enough so that it will remain in the restricted passages during subsequent draining operations to provide a solid and continuous shell mold, and having sufficiently large refractory grains so that the slurry packed into said restricted passages will not crack on hardening, applying a vacuum to said slurry bath with the pattern immersed therein until substantially all occluded air is removed, said vacuum being great enough that the slurry will be forced into the restricted passages of the pattern and will be caused to substantially uniformly coat said pattern when the vacuum is released and the slurry bath is restored to atmospheric pressure, restoring said slurry to atmospheric pressure so that the slurry is forced into the restricted passages to substantially uniformly coat said pattern, removing the pattern from the slurry bath, draining excess slurry from the pattern, and applying a stuccoing material to said another coating of slurry, drying said another refractory coating, and thereafter continuing to build up the shell mold by the steps including dipping the pattern into a refractory slurry, stuccoing, and drying.

6. A process of building a shell mold around a disposable pattern comprising applying a first thin refractory coating to said pattern, drying said coating, preparing a refractory slurry consisting essentially of a refractory material in an aqueous binder solution of silica-sol and polyvinyl alcohol, said polyvinyl alcohol being in the range of from about 0.5% to about 2.0% by weight, said refractory slurry having a viscosity in the range of from about 7,000 centipoises to about 10,000 centipoises, coating the pattern with said refractory slurry, stuccoing the pattern, and hardening the refractory coating of slurry.

7. The process of claim 6 wherein the step of coating the pattern with said refractory slurry includes the steps of placing the pattern in said slurry, applying a vacuum to the slurry until substantially all occluded air is removed, and restoring the slurry to atmospheric pressure so that the slurry is forced to substantially uniformly coat said pattern.

References Cited in the file of this patent
UNITED STATES PATENTS

| | | |
|---|---|---|
| 2,274,186 | Brace | Feb. 24, 1942 |
| 2,416,506 | Vest | Feb. 25, 1947 |
| 2,521,614 | Valyi | Sept. 5, 1950 |
| 2,765,507 | Wolf et al. | Oct. 9, 1956 |
| 2,820,265 | Kohl et al. | Jan. 21, 1958 |
| 2,822,592 | Wendt | Feb. 11, 1958 |
| 2,908,952 | Benham | Oct. 20, 1959 |
| 2,912,729 | Webb | Nov. 17, 1959 |
| 2,948,032 | Reuter | Aug. 9, 1960 |
| 3,051,669 | Emblem | Aug. 28, 1962 |